United States Patent
Kwatra et al.

(10) Patent No.: US 11,770,585 B2
(45) Date of Patent: Sep. 26, 2023

(54) REACTION BASED REAL TIME NATURAL LANGUAGE CONTENT ADJUSTMENT

(71) Applicant: International Business Machines Corporation, Armonk, NY (US)

(72) Inventors: Shikhar Kwatra, San Jose, CA (US); Sai Krishna Reddy Gudimetla, Jersey City, NJ (US); Aaron K. Baughman, Cary, NC (US); Mauro Marzorati, Lutz, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/537,061

(22) Filed: Nov. 29, 2021

(65) Prior Publication Data
US 2023/0171466 A1 Jun. 1, 2023

(51) Int. Cl.
*H04N 21/458* (2011.01)
*H04N 21/442* (2011.01)
*G06V 40/20* (2022.01)
*G10L 15/18* (2013.01)
*G06F 40/30* (2020.01)
*G06V 20/40* (2022.01)

(52) U.S. Cl.
CPC ....... *H04N 21/44218* (2013.01); *G06F 40/30* (2020.01); *G06V 20/41* (2022.01); *G06V 40/20* (2022.01); *G10L 15/1815* (2013.01); *H04N 21/458* (2013.01)

(58) Field of Classification Search
None
See application file for complete search history.

(56) References Cited

U.S. PATENT DOCUMENTS

| | | | |
|---|---|---|---|
| 8,560,729 | B2 | 10/2013 | Jabri et al. |
| 9,158,745 | B2 | 10/2015 | Barger et al. |

(Continued)

FOREIGN PATENT DOCUMENTS

| | | |
|---|---|---|
| CA | 2802739 C | 8/2014 |
| EP | 1556775 B1 | 3/2016 |

OTHER PUBLICATIONS

Chen et al., Virtual Content Creation Using Dynamic Omnidirectional Texture Synthesis, Mar. 18-22, 2018 IEEE Conference on Virtual Reality and 3D User Interfaces, Reutlingen, Germany.

(Continued)

*Primary Examiner* — Jefferey F Harold
*Assistant Examiner* — Charles N Hicks
(74) *Attorney, Agent, or Firm* — Garg Law Firm, PLLC; Rakesh Garg; Michael O'Keefe (57) ABSTRACT

Using a sentiment analysis model, a reaction to a presentation of a first content is measured. Using the first content and the reaction, a content generation parameter is determined. Using a first content generation model and the content generation parameter, second content corresponding to the first content is generated. Using a second content generation model and the content generation parameter, third content corresponding to the first content is generated. The first content is adjusted by combining the first content with the second content and the third content, the adjusting resulting in an adjusted content.

20 Claims, 8 Drawing Sheets

(56) References Cited

U.S. PATENT DOCUMENTS

| | | | |
|---|---|---|---|
| 9,477,380 | B2 | 10/2016 | Amijee |
| 2017/0171614 | A1 | 6/2017 | el Kaliouby et al. |
| 2017/0220570 | A1* | 8/2017 | Tilaye .................. H04N 21/466 |
| 2018/0035142 | A1* | 2/2018 | Rao ..................... H04N 21/4667 |
| 2019/0349212 | A1 | 11/2019 | Heins et al. |
| 2020/0271823 | A1* | 8/2020 | Herman ................... G01V 8/20 |
| 2021/0058436 | A1 | 2/2021 | Mombourquette et al. |
| 2021/0076002 | A1 | 3/2021 | Peters et al. |
| 2021/0271823 | A1* | 9/2021 | De Ridder ............... G06N 5/02 |

OTHER PUBLICATIONS

Deng et al., Adaptive Content Model for Multimedia Presentation, 2002, IEEE, Proceedings of the First International Symposium on Cyber Worlds.

He et al., A Flexible Content Adaptation System Using a Rule-Based Approach, Jan. 2007, IEEE Transactions on Knowledge and Data Engineering, vol. 19, No. 1.

Thalmann et al., Needles in the Haystack: Finding Content Worth Preparing for Workplace Learning with the KEP Model, IEEE Transactions on Learning Technologies, Jul.-Sep. 2017, pp. 379-390, vol. 10, No. 3.

Perlow et al., Stop the Meeting Madness, Harvard Business Review, Jul.-Aug. 2017, https://hbr.org/2017/07/stop-the-meeting-madness.

Bradbury, Attention span during lectures: 8 seconds, 10 minutes, or more?, Oct. 19, 2016, Advances in Physiology Education. 40. 509-513, 2016.

Meetingking, $37 billion per year in unnecessary meetings, what is your share?, Oct. 21, 2013, https://meetingking.com/37-billion-per-year-unnecessary-meetings-share/.

* cited by examiner

REACTION BASED REAL TIME NATURAL LANGUAGE CONTENT ADJUSTMENT

BACKGROUND

The present invention relates generally to a method, system, and computer program product for natural language content adjustment. More particularly, the present invention relates to a method, system, and computer program product for reaction based real time natural language content adjustment.

Presentations of natural language content are common in both work and leisure settings. A presentation of natural language content includes one or more of a text, still image, audio, or video component. Some common presentation formats are a document, a slide presentation, a video (with or without audio), and a podcast (an audio-only format). Some presentations also include a live or recorded human presenter presenting the content.

SUMMARY

The illustrative embodiments provide a method, system, and computer program product. An embodiment includes a method that measures, using a sentiment analysis model, a reaction to a presentation of a first content. An embodiment determines, using the first content and the reaction, a content generation parameter. An embodiment generates, using a first content generation model and the content generation parameter, second content corresponding to the first content. An embodiment generates, using a second content generation model and the content generation parameter, third content corresponding to the first content. An embodiment adjusts, by combining the first content with the second content and the third content, the first content, the adjusting resulting in an adjusted content.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that viewers' reactions to a presentation of content vary. For example, a viewer might be engaged or excited by one presentation and bored or disgusted by another presentation. Some example sources of reaction variation include the topic (e.g. one viewer might be fascinated by a presentation on dogs while another viewer might be scared), style of presentation (e.g. one viewer might find an all-text presentation efficient while another might be bored), interactivity of the presentation (e.g. one viewer might prefer a lecture format while another might prefer an interactive discussion or an opportunity to practice an element of the presentation material), and language of the presentation (e.g. one viewer might not understand a presentation in French, or understand French but lack French vocabulary in a particular subject matter, while another viewer might be fluent in French and have no difficulty understanding the presentation).

The illustrative embodiments also recognize that a human presenter might not be available, or might lack the skill to adapt a presentation to a viewer's reaction in real time. For example, a presentation might be recorded for a series of presentations to different groups of viewers, a human presenter might not be permitted to vary the presentation due to a standardization requirement, or a human presenter might lack the skill to evaluate a viewer reaction and adjust accordingly. Thus, the illustrative embodiments recognize that there is an unmet need to perform natural language content adjustment, based on a viewer's reaction and in real time.

The illustrative embodiments recognize that the presently available tools or solutions do not address these needs or provide adequate solutions for these needs. The illustrative embodiments used to describe the invention generally address and solve the above-described problems and other problems related to reaction based real time natural language content adjustment.

An embodiment can be implemented as a software application. The application implementing an embodiment can be configured as a modification of an existing content presentation system, as a separate application that operates in conjunction with an existing content presentation system, a standalone application, or some combination thereof.

Particularly, some illustrative embodiments provide a method that uses a sentiment analysis module to measure a reaction to a presentation of a first content, uses the first content and the reaction to determine a content generation parameter, uses a first content generation model and the content generation parameter to generate second content corresponding to the first content, uses a second content generation model and the content generation parameter to generate third content corresponding to the first content, and adjusts the first content by combining the first set of content with the second content and the third content.

An embodiment receives presented content and data of a viewer's reaction to the presented content. One embodiment receives presented content and data of a viewer's reaction to the presented content concurrently.

An embodiment measures a reaction of one or more viewers to a presentation of natural language content. In one embodiment, the measured reaction includes an engagement score and one or more emotion scores. An engagement score measures a viewer's amount of engagement with, or interest in, the presentation. One embodiment uses an engagement score range of minus one to plus one, in which minus one denotes maximum disengagement (e.g. the viewer is asleep), plus one denotes maximum engagement (e.g. the viewer is paying as much attention as possible), and zero denotes an engagement level halfway between the two extremes. Another embodiment uses an engagement score range of zero to one, in which zero denotes maximum disengagement, one denotes maximum engagement, and 0.5 denotes an engagement level halfway between the two extremes. Other engagement scores and ranges are also possible and contemplated within the scope of the illustrative embodiments. An emotion score measures a viewer's amount of emotion. One embodiment uses an emotion score range of minus one to plus one, in which minus one denotes maximum negative emotion (e.g. the viewer hates the presentation), plus one denotes maximum positive emotion (e.g. the viewer loves the presentation), and zero denotes an emotion level halfway between the two extremes. Another embodiment uses an emotion score range of zero to one, in which zero denotes maximum negative emotion, one denotes maximum positive emotion, and 0.5 denotes an emotion level halfway between the two extremes. Another embodiment measures multiple emotions and combines them into one emotion score. Other engagement scores and ranges are also possible and contemplated within the scope of the illustrative embodiments.

To measure a reaction, an embodiment uses one or more sentiment analysis models. One embodiment uses a video camera to monitor a presentation viewer's reaction to a presentation (on an opt-in basis), and uses a visual sentiment analysis model to analyze the resulting video data. Techniques for recognizing features within video, for example performing motion estimation, background subtraction, object tracking, object pose estimation, and detection of objects such as faces, eyes, and other elements of a presentation viewer's face and body, are presently available. For example, OpenCV, an open source computer vision library, provides this functionality.

Another embodiment monitors a presentation viewer's textual reaction to a presentation, on an opt-in basis. A textual reaction includes a communication, either in text or converted to text from another format, including a presentation viewer, that is generated concurrently with viewing of a presentation. Some non-limiting examples of a textual reaction to a presentation are an email, a text message, and a posting on a social media platform. For example, two viewers of a presentation might also be texting each other complaining about how boring the presentation is, or a viewer might be emailing a co-worker suggesting that the presentation is helpful and should be offered to their entire project team. The embodiment uses a textual sentiment analysis model to analyze the text data. Techniques for performing textual sentiment analysis and providing scored results are presently known.

Another embodiment uses a microphone to monitor a presentation viewer's reaction to a presentation (on an opt-in basis), and uses an audio sentiment analysis model to analyze the resulting audio data. One audio sentiment analysis model uses a presently known technique to recognize features such as laughter, clapping, and snoring, as well as convert spoken word elements such as viewer questions to text for textual sentiment analysis in a manner described herein.

An embodiment uses a sentiment analysis model to determine a sentiment of the presented content, and uses the determined sentiment when measuring a viewer's reaction to the content. Techniques for determining sentiment within natural language content are presently known.

One embodiment includes a transformer portion. A transformer is a deep learning model that uses an attention mechanism to differentially weight different portions of an input sequence, providing context for a portion currently being processed. In particular, the transformer portion uses text data determined by one or more sentiment analysis models to compute one or more content generation parameters. In particular, the content generation parameters are set based on sentiment patterns in an input portion. For example, an embodiment might detect a pattern in which the trailing phrases of sentences are mostly positive, and adjust a content generation parameter to boost the importance of trailing phrases of sentences accordingly. In one embodiment, a content generation parameter is a weight to be applied to a particular portion of input content for use in adjusting the input content. A comparatively higher weight indicates a portion of an input portion (e.g. a sentence) that is correspondingly more important, while a comparatively lower weight indicates a portion of an input portion (e.g. a sentence) that is correspondingly less important. In another embodiment, a content generation parameter is a time constraint for use in adjusting the input content. Some non-limiting examples of a time constraint are that an upcoming portion of the content should be shortened (perhaps because a viewer is over a threshold disengagement level), lengthened, or omitted entirely.

An embodiment implements a threshold used in generating content generation parameters. One threshold used in generating content generation parameters is an engagement score threshold. For example, if a viewer's engagement score is below the engagement score threshold, an embodiment might adjust one or more content generation parameters to indicate how much or which type of content should be generated.

An embodiment uses a content generation model and any content generation parameters to generate new content corresponding to the input content. The new content comprises one or more of a text, still image, audio, or video component, while conforming to the subject matter of the input content and any time constraints specified in content generation parameters. In one embodiment, the content generation model is an animation engine and the new content is a more animated version of the existing content. One embodiment uses one or more trained Generative Adversarial Networks (GANs). A GAN is a presently known model that includes two sub-models: a generator model trained to generate new examples of input data, and a discriminator model that tries to classify generated examples as either real (from real input data) or fake (generated by the generator). The two sub-models are trained together until the discriminator is fooled about half the time, meaning the generator is generating plausible examples. In particular, an embodiment uses one or more GANs to generate pictorial content from textual content. For example, a text-only portion of content might be turned into a graphical image. Techniques for utilizing GANs to generate new content corresponding to the input content in a manner described herein are presently available.

An embodiment uses a second content generation model and any content generation parameters to generate new content corresponding to the input content. The new content comprises one or more of a text, still image, audio, or video component, while conforming to the subject matter of the input content and any time constraints specified in content generation parameters. In one embodiment, the content generation model is an breaks engine and the new content is break content to be inserted into the existing content. Break content is content encouraging viewers of a presentation to take a break. Some non-limiting examples of break content are a slide announcing a break and including a countdown timer denoting the time remaining in the break, a video segment demonstrating a physical exercise viewers are to perform, a poll soliciting viewer input, and a joke. One embodiment uses one or more trained GANs to generate breaks content. In one embodiment, the models used to generate animation content and break content are different from each other; in another embodiment, the same model is used to generate both animation content and break content. Techniques for utilizing GANs to generate break content in a manner described herein are presently available.

An embodiment generates disruption data for insertion into the content. Disruption data changes a delivery pace of a content presentation, without altering the content itself. For example, disruption data might delay the next slide in a presentation by several seconds, or delay the delivery of streaming virtual event, altering the delivery pace of the presentation just enough to increase a viewer's because something apparently random has occurred.

An embodiment adjusts the input content by combining the input content with the output of the animation and breaks engines, as altered by the disruption data, in real time. One embodiment uses one or more sequence-to-sequence models to combine content. A sequence-to-sequence model is a presently known model that takes a sequence of items (e.g. words or portions of video or audio content) and outputs another sequence of items. In particular, an embodiment uses one or more sequence-to-sequence models to insert GAN-generated content into original content. For example, using output from the animation engine, a static image might be turned into a sequence of images or a video clip, or a text-only portion of content might be turned into an illustration including graphics. As well, break content such as a slide announcing a break and including a countdown timer denoting the time remaining in the break, a video segment demonstrating a physical exercise viewers are to perform, a poll soliciting viewer input, and a joke might be inserted into the original content.

An embodiment uses the sentiment analysis model to measure a viewer's reaction to the adjusted content. An embodiment uses the adjusted content, the original content, and the reaction to adjust one or more content generation parameters. Another embodiment uses the adjusted content, the original content, and the reaction to adjust one or more thresholds used to generate content generation parameters.

The manner of reaction based real time natural language content adjustment described herein is unavailable in the presently available methods in the technological field of endeavor pertaining to automated content presentation. A method of an embodiment described herein, when implemented to execute on a device or data processing system, comprises substantial advancement of the functionality of that device or data processing system in using a sentiment analysis module to measure a reaction to a presentation of a first content, using the first content and the reaction to determine a content generation parameter, using a first content generation model and the content generation parameter to generate second content corresponding to the first content, using a second content generation model and the content generation parameter to generate third content corresponding to the first content, and adjusting the first content by combining the first set of content with the second content and the third content.

The illustrative embodiments are described with respect to certain types of contents, content generation models, content generation parameters, sentiment analysis models, thresholds, reactions, scores, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
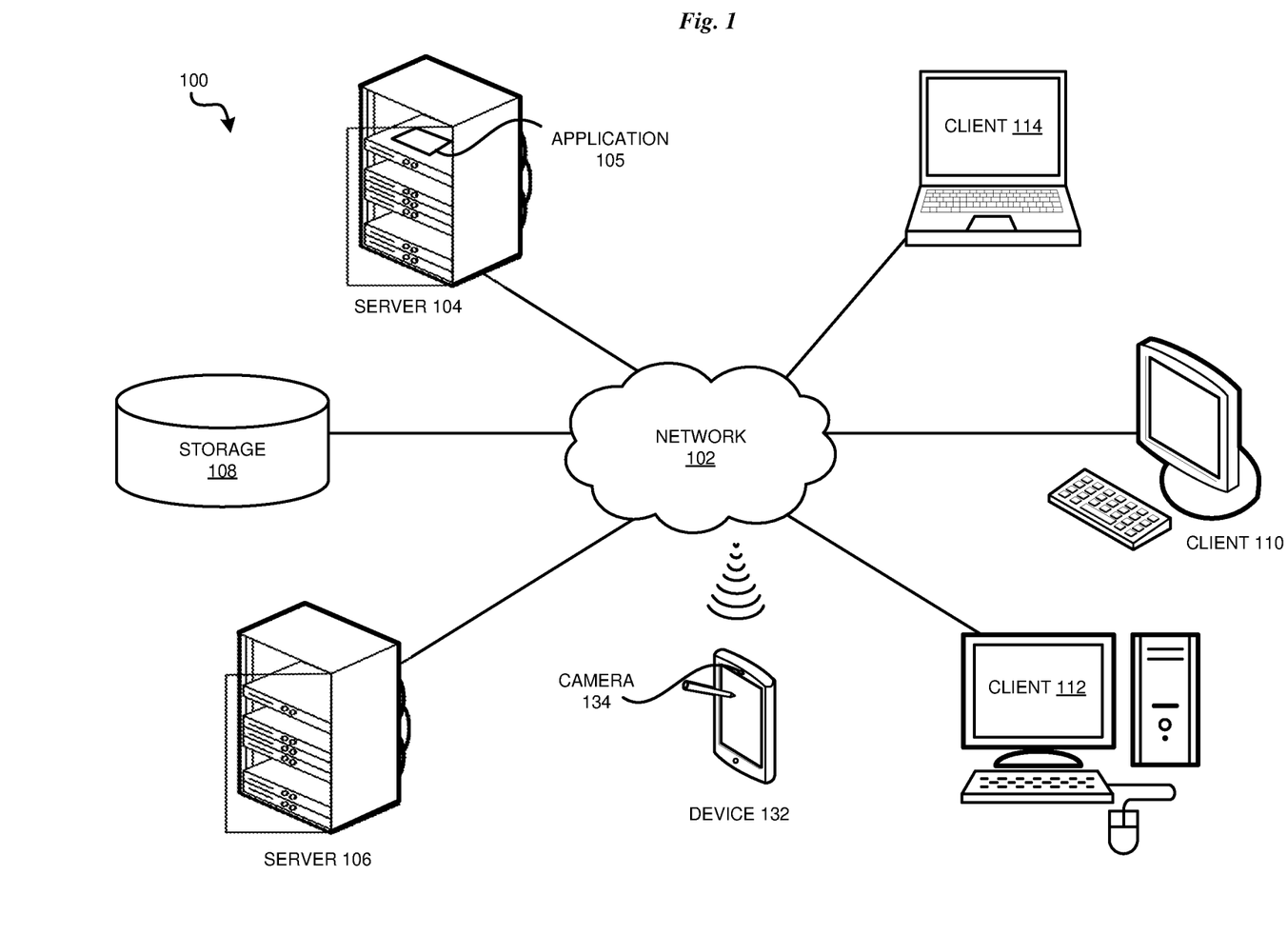
FIG. 1 depicts a block diagram of a network of data processing systems in which illustrative embodiments may be implemented.
Figure 2:
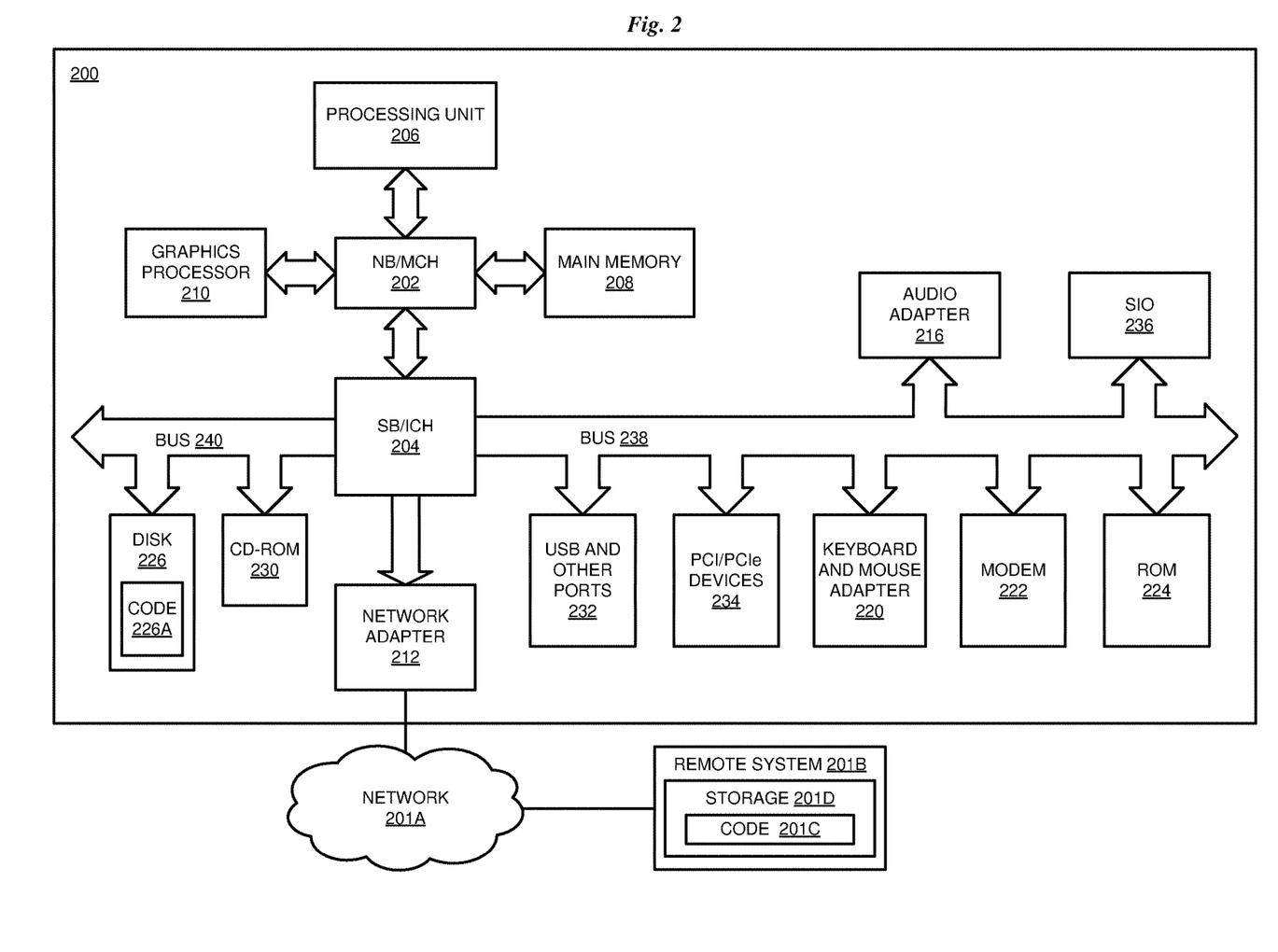
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 includes camera 134, for use in monitoring a viewer of a presentation. Device 132 can also include additional instrumentation (not shown) for use in monitoring a viewer of a presentation.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
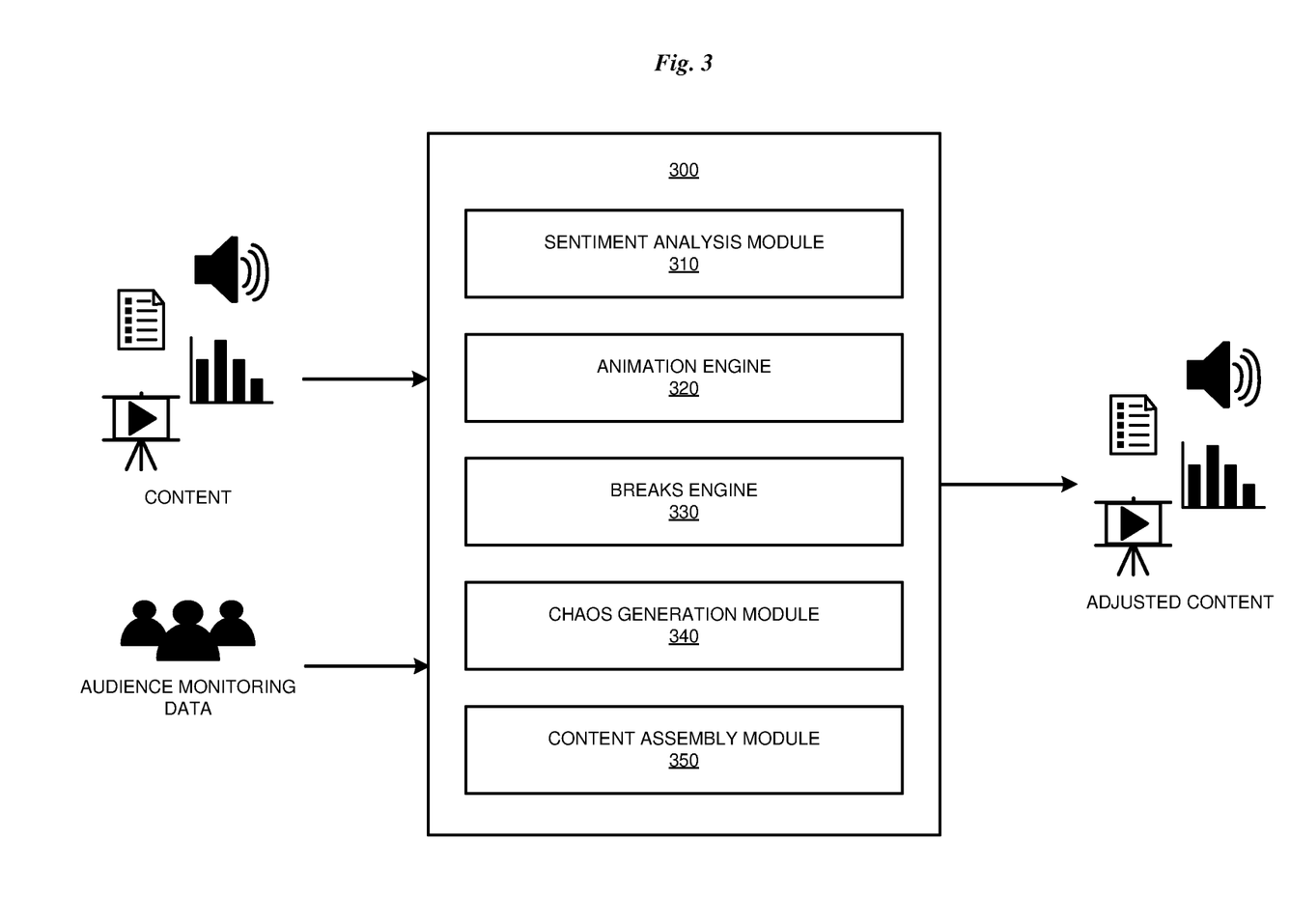
FIG. 3 depicts a block diagram of an example configuration for reaction based real time natural language content adjustment in accordance with an illustrative embodiment.

With reference to FIG. 3, this figure depicts a block diagram of an example configuration for reaction based real time natural language content adjustment in accordance with an illustrative embodiment. Application 300 is an example of application 105 in FIG. 1 and executes in any of servers 104 and 106, clients 110, 112, and 114, and device 132 in FIG. 1.

Application 300 receives presented content and data of a viewer's reaction to the presented content. One implementation of application 300 receives presented content and data of a viewer's reaction to the presented content concurrently.

Sentiment analysis module 310 measures a reaction of one or more viewers to a presentation of natural language content. In one implementation of module 310, the measured reaction includes an engagement score and one or more emotion scores. One implementation of module 310 uses an engagement score range of minus one to plus one, in which minus one denotes maximum disengagement (e.g. the viewer is asleep), plus one denotes maximum engagement (e.g. the viewer is paying as much attention as possible), and zero denotes an engagement level halfway between the two extremes. Another implementation of module 310 uses an engagement score range of zero to one, in which zero denotes maximum disengagement, one denotes maximum engagement, and 0.5 denotes an engagement level halfway between the two extremes. One implementation of module 310 uses an emotion score range of minus one to plus one, in which minus one denotes maximum negative emotion (e.g. the viewer hates the presentation), plus one denotes maximum positive emotion (e.g. the viewer loves the presentation), and zero denotes an emotion level halfway between the two extremes. Another implementation of module 310 uses an emotion score range of zero to one, in which zero denotes maximum negative emotion, one denotes maximum positive emotion, and 0.5 denotes an emotion level halfway between the two extremes.

To measure a reaction, module 310 uses one or more sentiment analysis models. One implementation of module 310 uses a video camera to monitor a presentation viewer's reaction to a presentation (on an opt-in basis), and uses a visual sentiment analysis model to analyze the resulting video data. Another implementation of module 310 monitors a presentation viewer's textual reaction to a presentation, on an opt-in basis, and uses a textual sentiment analysis model to analyze the textual reaction. Another implementation of module 310 uses a microphone to monitor a presentation viewer's reaction to a presentation (on an opt-in basis), and uses an audio sentiment analysis model to analyze the resulting audio data. Module 310 also uses a sentiment analysis model to determine a sentiment of the presented content, and uses the determined sentiment when measuring a viewer's reaction to the content.

Module 310 includes a transformer portion, which uses reaction data determined by one or more sentiment analysis models to compute one or more content generation parameters. In one implementation of module 310, a content generation parameter is a weight to be applied to a particular portion of input content for use in adjusting the input content. In another implementation of module 310, a content generation parameter is a time constraint for use in adjusting the input content. Module 310 implements a threshold used in generating content generation parameters. One threshold used in generating content generation parameters is an engagement score threshold.

Animation engine 320 uses a content generation model and any content generation parameters to generate new content corresponding to the input content. The new content comprises one or more of a text, still image, audio, or video component, while conforming to the subject matter of the input content and any time constraints specified in content generation parameters. In one implementation of animation engine 320, the new content is a more animated version of the existing content. One implementation of animation engine 320 uses one or more trained GANs to generate pictorial content from textual content.

Breaks engine 330 uses a second content generation model and any content generation parameters to generate new content corresponding to the input content. The new content comprises one or more of a text, still image, audio, or video component, while conforming to the subject matter of the input content and any time constraints specified in content generation parameters. In one implementation of breaks engine 330, the new content is break content to be inserted into the existing content. One implementation of breaks engine 330 uses one or more trained GANs to generate breaks content.

Chaos generation module 340 generates disruption data for insertion into the content. Disruption data changes a delivery pace of a content presentation, without altering the content itself.

Content assembly module 350 adjusts the input content by combining the input content with the output of the animation and breaks engines, as altered by the disruption data. One implementation of module 350 uses one or more sequence-to-sequence models to insert GAN-generated content into original content. For example, using output from animation engine 320, a static image might be turned into a sequence of images or a video clip, or a text-only portion of content might be turned into an illustration including graphics. As well, output from breaks engine 330, such as a slide announcing a break and including a countdown timer denoting the time remaining in the break, a video segment demonstrating a physical exercise viewers are to perform, a poll soliciting viewer input, and a joke might be inserted into the original content.

Sentiment analysis module 310 uses the sentiment analysis model to measure a viewer's reaction to the adjusted content. Module 310 uses the adjusted content, the original content, and the reaction to adjust one or more content generation parameters. Another implementation of module 310 uses the adjusted content, the original content, and the reaction to adjust one or more thresholds used to generate content generation parameters.

Figure 4:
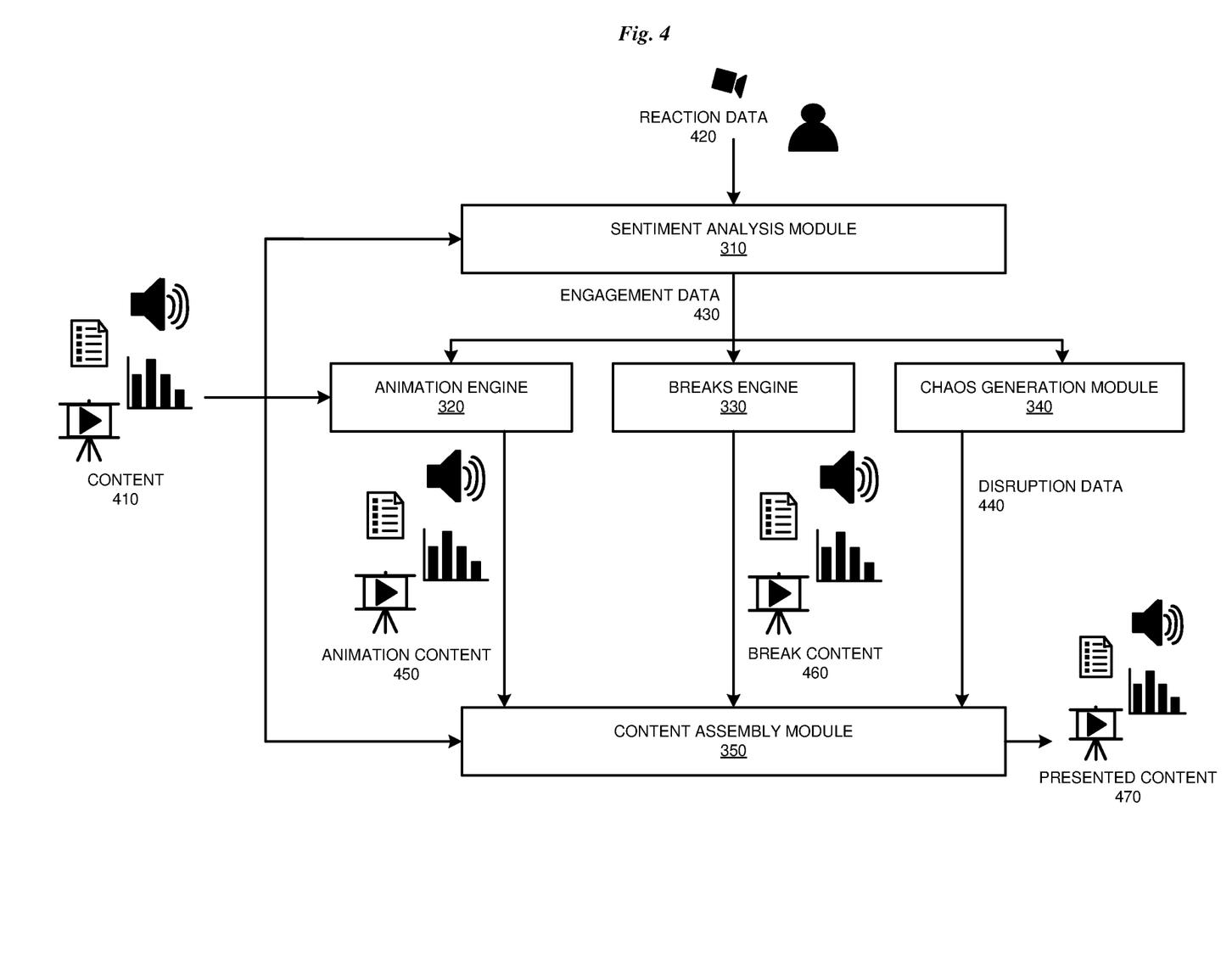
FIG. 4 depicts an example of reaction based real time natural language content adjustment in accordance with an illustrative embodiment.

With reference to FIG. 4, this figure depicts an example of reaction based real time natural language content adjustment in accordance with an illustrative embodiment. The example can be executed using application 300 in FIG. 3. Sentiment analysis module 310, animation engine 320, breaks engine 330, chaos generation module 340, and content assembly module 350 are the same as sentiment analysis module 310, animation engine 320, breaks engine 330, chaos generation module 340, and content assembly module 350 in FIG. 3.

Sentiment analysis module 310 receives content 410, presented natural language content. Module 310 also receives reaction data 420, data of a viewer's reaction to the content 410. Module 310 uses content 410 and reaction data 420 to measures a reaction of one or more viewers to a presentation of natural language content, and uses the reaction to compute engagement data 430, including one or more content generation parameters.

Animation engine 320 uses content 410 and engagement data 430 to generate animation content 450, one or more of a text, still image, audio, or video component, that conforms to the subject matter of content 410 and any time constraints specified in content generation parameters. Breaks engine 330 uses content 410 and engagement data 430 to generate break content 460, one or more of a text, still image, audio, or video component that conforms to the subject matter of content 410 and any time constraints specified in content generation parameters. Chaos generation module 340 generates disruption data 440. Content assembly module combines content 410, animation content 450, break content 460, as altered by disruption data 440, into presented content 470.

Figure 5:
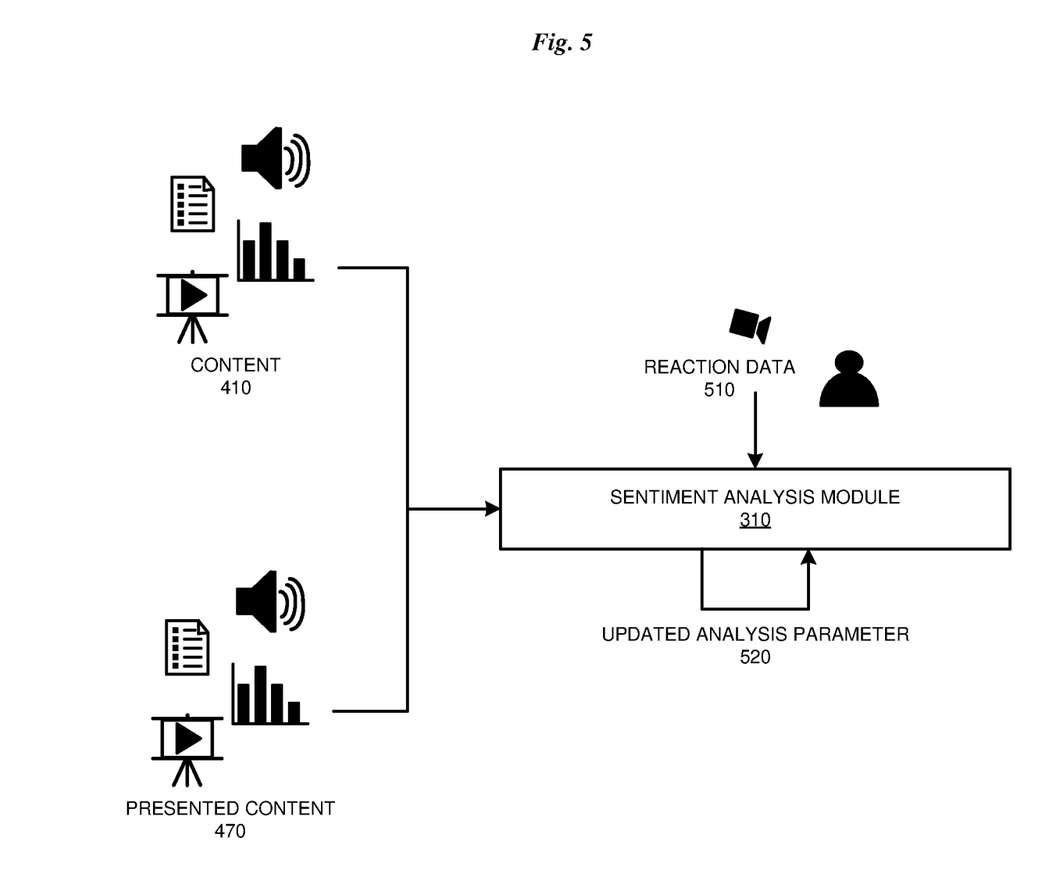
FIG. 5 depicts a continued example of reaction based real time natural language content adjustment in accordance with an illustrative embodiment.

With reference to FIG. 5, this figure depicts a continued example of reaction based real time natural language content adjustment in accordance with an illustrative embodiment. Sentiment analysis module 310 is the same as sentiment analysis module 310 in FIG. 3. Content 410 and presented content 470 are the same as content 410 and presented content 470 in FIG. 4.

Sentiment analysis module 310 receives reaction data 510, data of a viewer's reaction to presented content 470. Module 310 uses content 410, presented content 470, and reaction data 510 to measures a reaction of one or more viewers to a presentation of natural language content to adjust one or more content generation parameters, or thresholds used to generate content generation parameters, as depicted in updated analysis parameter 520.

Figure 6:
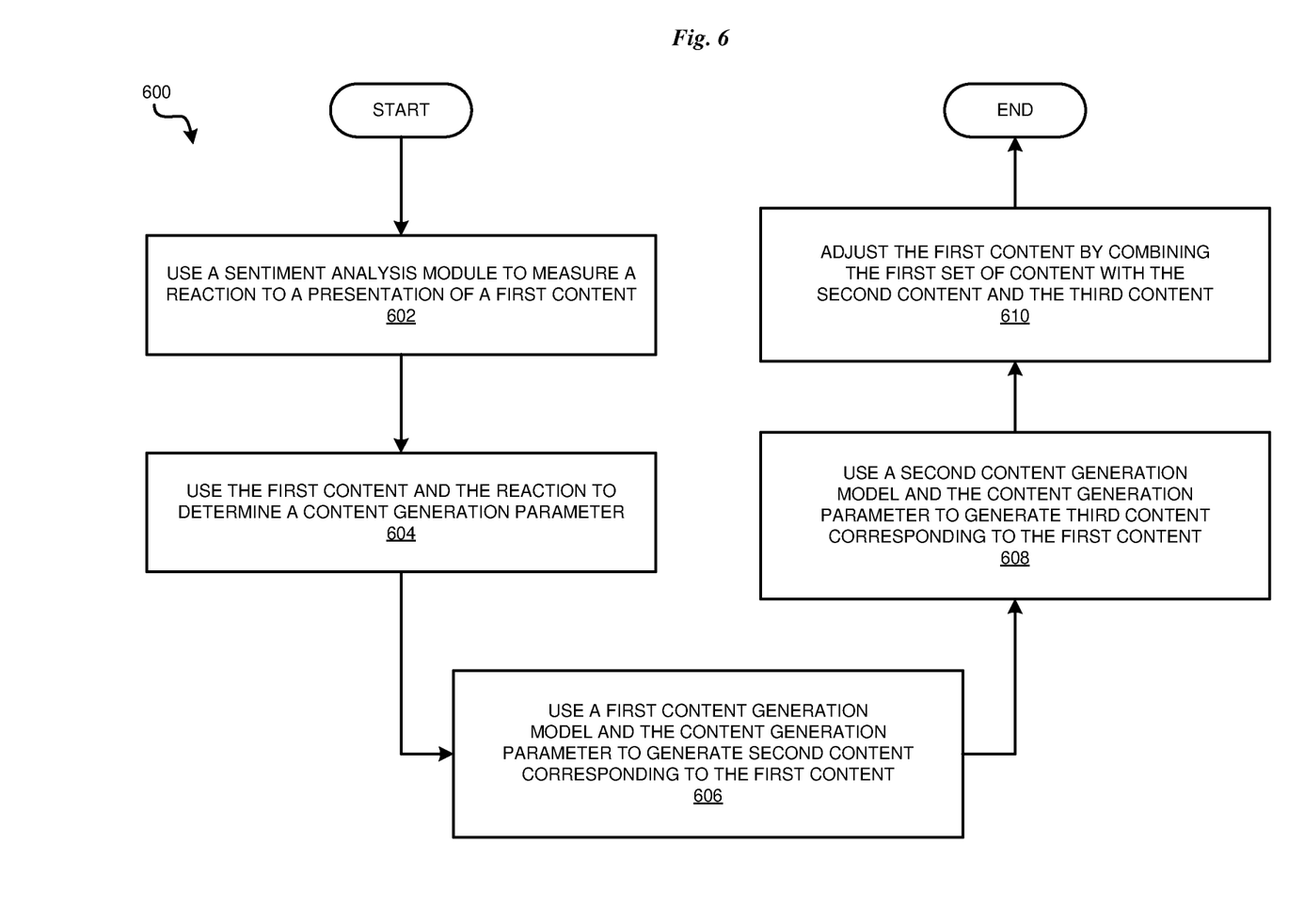
FIG. 6 depicts a flowchart of an example process for reaction based real time natural language content adjustment in accordance with an illustrative embodiment.

With reference to FIG. 6, this figure depicts a flowchart of an example process for reaction based real time natural language content adjustment in accordance with an illustrative embodiment. Process 600 can be implemented in application 300 in FIG. 3.

In block 602, the application uses a sentiment analysis module to measure a reaction to a presentation of a first content. In block 604, the application uses the first content and the reaction to determine a content generation parameter. In block 606, the application uses a first content generation model and the content generation parameter to generate second content corresponding to the first content. In block 608, the application uses a second content generation model and the content generation parameter to generate third content corresponding to the first content. In block 610, the application adjusts the first content by combining the first set of content with the second content and the third content. Then the application ends.

Figure 7:
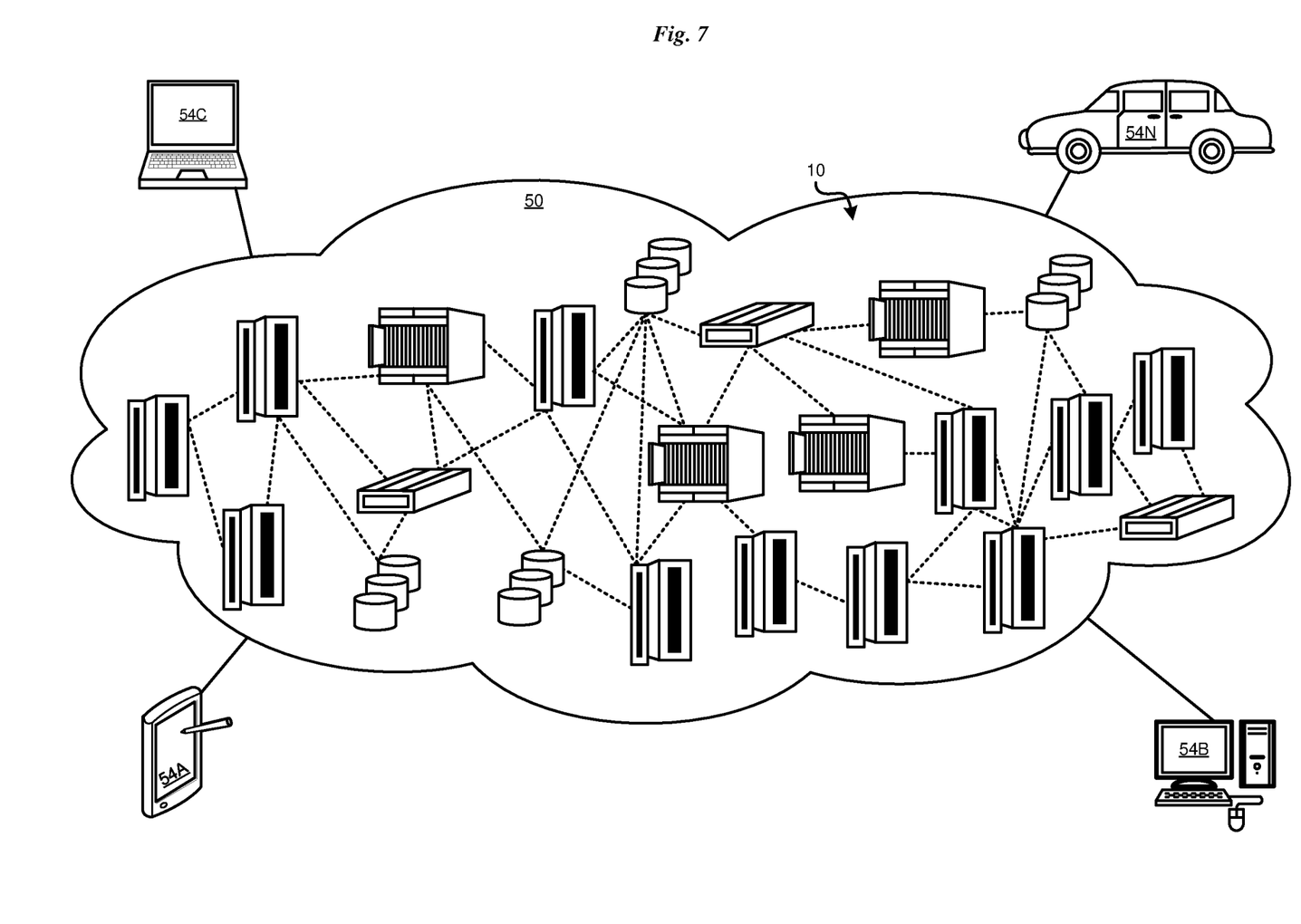
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 8:
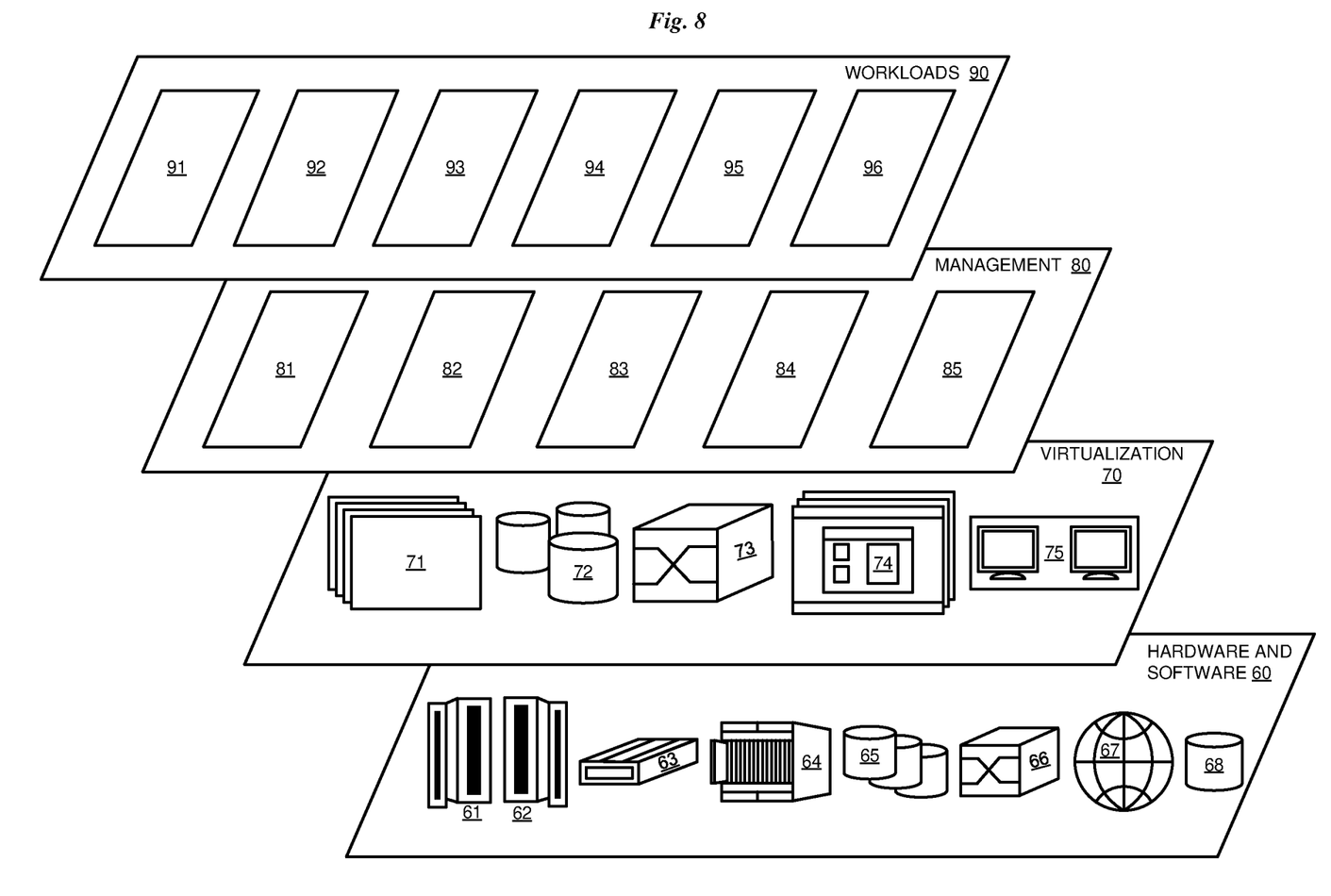
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for reaction based real time natural language content adjustment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   measuring, using a sentiment analysis model, a reaction to a presentation of a first content;
   determining, using the first content and the reaction, a content generation parameter, the content generation parameter comprising a weight to be applied to a portion of the first content, the weight set according to an importance of the portion;
   generating, using a first content generation model and the content generation parameter, second content corresponding to the first content, the second content comprising an illustration of a text-only portion of the first content;
   generating, using a second content generation model and the content generation parameter, third content corresponding to the first content, the third content comprising break content; and
   adjusting, by combining the first content with the second content and the third content, the first content, the adjusting resulting in an adjusted content.

2. The computer-implemented method of claim 1, wherein the reaction comprises an engagement score and an emotion score.

3. The computer-implemented method of claim 2, wherein the reaction is determined by analyzing video data of a viewer of the presentation, the video data generated concurrently with viewing of the presentation by the viewer.

4. The computer-implemented method of claim 2, wherein the reaction is determined by analyzing a natural language communication of a viewer of the presentation, the natural language communication generated concurrently with viewing of the presentation by the viewer.

5. The computer-implemented method of claim 1, further comprising:
   adjusting, by combining disruption data with the adjusted content, a delivery pace of the adjusted content.

6. The computer-implemented method of claim 1, further comprising:
   measuring, using the sentiment analysis model, a second reaction to a presentation of the adjusted content.

7. The computer-implemented method of claim 6, further comprising:
   adjusting, using the first content, the adjusted content, and the second reaction, a threshold, the threshold used to generate the content generation parameter.

8. The computer-implemented method of claim 6, further comprising:
   adjusting, using the first content, the adjusted content, and the second reaction, the content generation parameter.

9. A computer program product for content adjustment, the computer program product comprising:
   one or more computer readable storage media, and program instructions collectively stored on the one or more computer readable storage media, the stored program instructions comprising:
   program instructions to measure, using a sentiment analysis model, a reaction to a presentation of a first content;
   program instructions to determine, using the first content and the reaction, a content generation parameter, the content generation parameter comprising a weight to be applied to a portion of the first content, the weight set according to an importance of the portion;
   program instructions to generate, using a first content generation model and the content generation parameter, second content corresponding to the first content, the second content comprising an illustration of a text-only portion of the first content;

program instructions to generate, using a second content generation model and the content generation parameter, third content corresponding to the first content, the third content comprising break content; and program instructions to adjust, by combining the first content with the second content and the third content, the first content, the adjusting resulting in an adjusted content.

10. The computer program product of claim 9, wherein the reaction comprises an engagement score and an emotion score.

11. The computer program product of claim 10, wherein the reaction is determined by analyzing video data of a viewer of the presentation, the video data generated concurrently with viewing of the presentation by the viewer.

12. The computer program product of claim 10, wherein the reaction is determined by analyzing a natural language communication of a viewer of the presentation, the natural language communication generated concurrently with viewing of the presentation by the viewer.

13. The computer program product of claim 9, the stored program instructions further comprising:

program instructions to adjust, by combining disruption data with the adjusted content, a delivery pace of the adjusted content.

14. The computer program product of claim 9, the stored program instructions further comprising:

program instructions to measure, using the sentiment analysis model, a second reaction to a presentation of the adjusted content.

15. The computer program product of claim 14, the stored program instructions further comprising:

program instructions to adjust, using the first content, the adjusted content, and the second reaction, a threshold, the threshold used to generate the content generation parameter.

16. The computer program product of claim 14, the stored program instructions further comprising:

program instructions to adjust, using the first content, the adjusted content, and the second reaction, the content generation parameter.

17. The computer program product of claim 9, wherein the stored program instructions are stored in the at least one of the one or more storage media of a local data processing system, and wherein the stored program instructions are transferred over a network from a remote data processing system.

18. The computer program product of claim 9, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 9, wherein the computer program product is provided as a service in a cloud environment.

20. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to measure, using a sentiment analysis model, a reaction to a presentation of a first content;

program instructions to determine, using the first content and the reaction, a content generation parameter, the content generation parameter comprising a weight to be applied to a portion of the first content, the weight set according to an importance of the portion;

program instructions to generate, using a first content generation model and the content generation parameter, second content corresponding to the first content, the second content comprising an illustration of a text-only portion of the first content;

program instructions to generate, using a second content generation model and the content generation parameter, third content corresponding to the first content, the third content comprising break content; and program instructions to adjust, by combining the first content with the second content and the third content, the first content, the adjusting resulting in an adjusted content.

* * * * *